United States Patent [19]

Isogai et al.

[11] Patent Number: 5,410,034

[45] Date of Patent: Apr. 25, 1995

[54] ALKALINE METHOD FOR DISSOLVING CELLULOSE

[75] Inventors: Akira Isogai, Chiba, Japan; Rajai H. Atalla, Verona, Wis.

[73] Assignee: The United States of America as represented by the Secretary of Agriculture, Washington, D.C.

[21] Appl. No.: 200,975

[22] Filed: Feb. 24, 1994

[51] Int. Cl.$^6$ .......................... C08B 1/08; C08B 16/00
[52] U.S. Cl. ....................................... 536/56; 536/57; 536/124
[58] Field of Search .............................. 536/56, 57, 124

[56] References Cited

U.S. PATENT DOCUMENTS 2,638,415  5/1953  Jones et al. ..................... 536/56

FOREIGN PATENT DOCUMENTS 260187  9/1988  Germany .

Primary Examiner—Nathan M. Nutter
Attorney, Agent, or Firm—M. Howard Silverstein; John D. Fado; Janet I. Stockhausen

[57] ABSTRACT

The present invention provides a cellulose solution prepared by dissolving a cellulose which has not previously been subject to explosive disruption at atmospheric pressures in an aqueous alkali solution which can be shaped into a fiber, film or other article or applied to the surface or treatment of other materials by coating, dipping, or other suitable methods.

8 Claims, No Drawings

ALKALINE METHOD FOR DISSOLVING CELLULOSE

FIELD OF THE INVENTION

The present invention relates generally to a method for dissolving cellulose. More particularly, the present invention relates to a process for the preparation of a cellulose solution and to fibers formed from this solution.

BACKGROUND OF THE INVENTION

The main industrial process that involves use of a cellulose solution is the manufacture of shaped articles, such as films and fibers. The viscose process has been the principal method for the manufacture of regenerated cellulose fibers in the past. The viscose process consists of steeping cellulose sheets in sodium hydroxide, shredding the sheets, aging the shredded sheets to form alkali cellulose, treating the alkali cellulose with carbon disulfide to form a cellulose xanthate solution, ripening and filtering the solution, extruding the solution through the small holes of a spinneret into an acid coagulating bath to form filaments, stretching the filaments and then washing, drying and packaging the fibers.

Even at present, the principal cellulose dissolving method that is used on an industrial scale for the purpose of forming fibers is the viscose method and the regeneration of cellulose fibers from cuprammonium cellulose solution is also used to some extent. Both of these processes involve the formation of a cellulose derivative. Films and fibers can be formed from these cellulose derivatives via regeneration of the solution of the derivative into acidic aqueous medium. These processes, however, are costly due to the use of numerous steps involved in preparing satisfactory solutions for fiber or film regeneration, which steps require expensive equipment or require high temperatures or high pressures or both. Also, in the viscose process, carbon disulfide is required in the preparation of the cellulose xanthate solution. The carbon disulfide is not part of the final regenerated cellulose and its presence in the system contributes to environmental problems.

There are other known cellulose-dissolving methods using a metal complex, although these methods have not generally been utilized industrially. As the metal complex used for dissolving cellulose, Cadoxene (cadmium/ethylenediamine/alkali), Coxene (cobalt/ethylenediamine/alkali), Zincoxene (zinc/ethylenediamine/alkali), Nioxene (nickel/ethylenediamine/alkali) and EWNN (iron/tartaric acid/alkali) have been used. Methods utilizing a metal complex, however, are not superior to the viscose method or the cuprammonium method, because toxic components, such as heavy metals and amines, are used and these methods are disadvantageous from an economical viewpoint.

In order to overcome the defects of the known cellulose-dissolving methods, a method for dissolving cellulose directly in an organic solvent or inorganic solution has been sought for a substantial period of time. As a result, various methods have been developed and proposed. Most of these methods, however, use a complicated multi-component solvent system which is expensive, require high temperatures or high pressures or both, and none of these methods have yet been used in practice, primarily because of toxicity, explosiveness and difficulty in recovering the solvents. Moreover, these methods are similar to the viscose method or the cuprammonium method in that the cellulose is converted to a derivative which is then dissolved. For example, U.S. Pat. No. 4,097,666 to Johnson, et al. describes a method of using a solvent system consisting of dimethyl sulfoxide and paraformaldehyde to dissolve cellulose in the form of methylol cellulose. It is also known that it is possible to dissolve cellulose in the form of cellulose nitrate utilizing dimethylformamide and $N_2O_4$. Solvent systems utilizing $SO_2$/amine and dimethylformamide/chloral have also been used to dissolve cellulose in the form of a derivative.

It is also known that if the degree of polymerization, hereinafter referred to as "DP" of cellulose is below about 20, the cellulose is soluble in an aqueous alkali solution and in hot dimethyl sulfoxide. However, cellulose fibers and films formed from such cellulose solutions do not have satisfactory properties and such cellulose solutions do not have a practical use for forming fibers and films. Apparently, the reason why low DP cellulose is soluble in an aqueous alkali solution is that the polymeric characteristics of cellulose, such as the molecular configuration defined by the hydrogen bond, is lost.

It is also known that an aqueous solution containing about 10 percent by weight of sodium hydroxide shows a strong swelling action for cellulose having a high degree of polymerization. It has been reported in the Journal of Prakt. Chem N.F. 158, 233 (1941) that natural cellulose, mercerized cellulose and regenerated cellulose are soluble in an aqueous 10 percent by weight solution of sodium hydroxide. Although the dissolving conditions and polymer concentrations are not described, it was reported that natural cellulose and mercerized cellulose are soluble for cellulose having a DP up to 400 and that regenerated cellulose is soluble if the DP is up to 1200. However, the text of this reference indicates that even a highly swollen gel is considered to be in the category of a "dissolved polymer".

U.S. Pat. No. 4,634,470 to Kamide, et al. reports substantial experiments based upon teachings provided by the Journal of Prakt. Chem. article. The Kamide, et al. patent indicates that it was found that the solubility of cellulose in an aqueous 10 percent by weight sodium hydroxide solution at $-5°$ C. to $5°$ C. is influenced by the polymer concentration and the degree of polymerization. For example, it is reported that cellulose 5 dispersions, even at a cellulose concentration of 0.5 percent by weight in 10% sodium hydroxide, when subjected to centrifugal separation at 20,000 rpm for 46 minutes, proved that the cellulose is not completely dissolved. Accordingly, it is concluded in the Kamide, et al. patent that the term "soluble" used in the Journal of Prakt. Chem means that cellulose is dissolved at a very low concentration in the gel-containing state. Such a solution of a low concentration of cellulose is of no practical value. The Kamide, et al. patent indicates that low solubility of cellulose in sodium hydroxide is confirmed from the fact that an aqueous alkali solution was used for the fractional dissolution of celluloses. This fractional dissolution is an operation of separating cellulose into an alkali soluble portion and an alkali/insoluble portion, according to the molecular weight of the cellulose and the aggregation state of the molecular chains, and that the soluble portion includes a gel. These facts indicate that it is technically very difficult to dissolve substantially all of a cellulose having a high degree of polymerization at a high cellulose concentration in an aqueous alkali solution having a single alkali composition. A cellulose/alkali solution has not been utilized as a solution in the formation of fibers or films in the cellulose industry.

The Kamide, et al. patent is directed to a method for preparing a cellulose solution by maintaining a mixture comprising 100 parts of cellulose which may have any crystal form and 10 to 100 parts by weight of a hydrogen bond-cleaving solution at 100° C. to 350° C. under a pressure of 10 to 250 atmospheres for a period of time and promptly exposing the mixture to explosive decompression. The cellulose mixture is then mixed with an aqueous alkali solution maintained at a temperature not higher than 50° C. The cellulose mixture is stirred at a temperature not higher than 10° C. to dissolve the cellulose in the aqueous alkali solution. The hydrogen bond-cleaving agent can be water, an aqueous solution of an alkali, an aqueous solution of an inorganic acid, an aqueous solution of a salt, an aqueous solution of hydrogen peroxide, an aqueous solution of a urea compound, an aqueous solution or dispersion of an amphoteric oxide or amphoteric hydroxide, a glycol, an amide, a sulfoxide, a halogenated acetic acid and a polyphenol.

U.S. Pat. No. 4,302,252 to Turbak, et al. is directed to a method for dissolving cellulose wherein cellulose is activated by penetration of the cellulose with a polar medium and mixing at a temperature at which no significant degradation occurs with an amide selected from the group consisting of dimethylacetamide, 1-methyl-2-pyrrolidinone and mixtures thereof and from 3 to 15 percent by weight of lithium chloride. The cellulose is then dissolved in the amide and lithium chloride in the substantial absence of any polar medium other than the amide. It does not appear that the process taught in Turbak, et al. has been reduced to practice by industry since the issuance of the patent. This appears to be due to the expense associated with the lithium chloride required to practice the invention which makes the practice of the invention economically prohibitive.

From the foregoing discussion of the prior art, it can be seen that it is technically extremely difficult to dissolve substantially all of a cellulose having a high DP, IO which includes any of the native forms of cellulose or celluloses isolated by industrial processes, at a high cellulose concentration in an aqueous alkali solution having a single alkali composition.

SUMMARY OF THE INVENTION

It is therefore a primary object of the present invention to provide a cellulose solution prepared by dissolving a cellulose having a relatively high degree of polymerization in an aqueous alkali solution which can be shaped into a fiber, film or other article or applied to the surface or treatment of other materials by coating, filming, dipping, or other similar suitable means.

Another object of the present invention is to provide a process for the preparation of the cellulose solution and a method for the use of the cellulose solution.

Another object of the invention is to provide a solvent for making derivatives, including homogeneous derivatizations, for example ethers.

Yet another object of the invention is to provide a process for the production of blends with other alkali-soluble polymers and for bead formation for some analytical gels.

Another object of the invention is to provide a process for the production of cellulose solutions which can be practiced at atmospheric pressures.

Yet another object of the invention is to provide a process for the production of cellulose solutions which does not require the subjection of that solution to explosive disruption to attain the desired results.

In one aspect of the present invention, a stable cellulose solution suitable for use in regenerating a cellulose shape is provided which comprises an aqueous alkali solution containing at least about 3 percent by weight of cellulose having a DP of at least about 100.

The method for dissolving cellulose of the invention includes the steps of providing a dispersion of cellulose in an aqueous alkali solution, cooling the cellulose dispersion to a temperature sufficient to form a solid mass of the cellulose dispersion, and warming the solid mass of the cellulose dispersion to a temperature sufficient to thaw the solid mass of the cellulose dispersion to provide a cellulose solution. In one embodiment of the invention, the thawed cellulose dispersion is diluted with water to provide the cellulose solution.

In another aspect of the present invention, a cellulose fiber is provided by passing the cellulose solution of the invention through an extruder into a coagulating bath containing an acidic aqueous medium to form a regenerated cellulose fiber and thereafter drawing and winding the regenerated cellulose fiber.

In still another aspect of the present invention, there is provided a method for treating an article which comprises coating or dispersing the cellulose solution of the invention onto the surface of the article or into the interior thereof and then neutralizing the applied cellulose solution with an acidic aqueous medium.

DETAILED DESCRIPTION OF THE INVENTION

Cellulose is the main polysaccharide in living plants and is a polymer of $\beta$-D-glucopyranosyl units which are linked together to form chains having a degree of polymerization (DP) of up to 4000 units. Cellulose occurs within plant cell walls, mainly in the form of fine fibrils which are visible under the optical microscope. In both the primary wall and thick secondary cell wall, these fibers are arranged side by side to form layers of lamellae and are normally inclined at an angle to the fiber axis. The electron microscope shows that the fibrils are composed of still finer microfibrils or micellar strings. The microfibrils are thought to consist of numerous nearly parallel cellulose molecules which are so exactly ordered at places that they form crystalline regions called crystallites or micelles. The micelles are interspersed by amorphous regions where the cellulose chains are in a less ordered state and may even be tangled.

Most heterogeneous reactions of cellulose occur slowly in the crystalline regions, but take place rapidly in the lower-density amorphous regions where the looser packing of cellulose chains permits easier penetration of the reagent molecules. Thus, acidic hydrolysis of cellulose, which takes place by splitting of the $\beta$-D-glucosidic linkages, occurs first in the amorphous regions. During the hydrolysis of the amorphous regions in wood or textile fibers, progressive weakening occurs. In the later stages, a powder may be formed which has a very high crystallinity because of the predominance of surviving micelles. This powder is a commercial product termed microcrystalline cellulose.

The manufacture of microcrystalline cellulose is described in U.S. Pat. No. 3,023,104 to Battista. As set forth in the Battista patent, microcrystalline cellulose, referred to in the Battista patent as cellulose crystalline aggregates, are products obtained by the controlled acid hydrolysis of cellulose. During the hydrolysis, an acid-soluble portion and an acid-insoluble portion are formed. The acid-insoluble portion of cellulose comprises a crystalline residue or remainder which is washed and recovered. Microcrystalline cellulose has a DP of from about 125 to about 375 anhydroglucose units.

Generally, in accordance with the present invention, microcrystalline cellulose having a DP of from about 125 to about 350 can be used in the method of the present invention without any pretreatment. Cellulose materials having a DP of above about 350 up to about 2000 may require a pretreatment as discussed more fully hereinbelow. Such higher DP celluloses include cotton linters and cellulose derived from wood pulp. The method of the present invention is also applicable to mercerized celluloses. Mercerized celluloses are generally prepared by soaking the cellulose in a 17.5% sodium hydroxide solution for one day at room temperature, followed by washing with a succession of water and dilute acetic acid washes. Mercerized celluloses are obtained after freeze drying the washed cellulose.

Generally in accordance with the present invention, the cellulose is dispersed in water at a level of from about 0.5% to about 15% to provide a cellulose suspension. All percentages used herein are by weight unless otherwise indicated. To the cellulose suspension is added a strong base at a level of from about 7.5% to about 12% on a cellulose free basis, i.e., strong base/strong base+ water. The strong base is preferably sodium hydroxide, but other strong bases such as potassium hydroxide, lithium hydroxide, cesium hydroxide, ammonium hydroxide, and quaternary ammonium hydroxides may be used. The cellulose suspension is stirred or shaken at room temperature until the sodium hydroxide, or other base, is dissolved.

After the complete dissolution of the sodium hydroxide, the cellulose suspension is cooled to a temperature sufficient that the suspension is completely frozen to form a solid, tight mass. In this connection, if the level of sodium hydroxide is above about 13%, the cellulose suspension cannot be frozen to form a solid, tight mass even at refrigeration temperatures of −20° C. Instead, a mushy gel is formed which is not suitable for the method of the present invention to provide a cellulose solution. The freezing of the cellulose suspension at levels of sodium hydroxide of between about 7% and about 12% can be effected by reducing the temperature to within the range of from about −10° C. to about −30° C.

The frozen, solid mass of the cellulose suspension is held at the freezing temperature for a period of time of from about 0 to about 5 hours. The frozen solid mass is then removed from the freezer and defrosted at room temperature to a temperature of approximately room temperature, preferably to a temperature of between about 20° C. and about 30° C. This step may be repeated more than once for the best results for a particular sample.

At some concentrations of sodium hydroxide within the indicated range, namely at a sodium hydroxide concentration of from about 7.5% to about 9.5%, the cellulose is dissolved without further treatment. In an important embodiment of the invention which is applicable to sodium hydroxide concentrations throughout the indicated range, the cellulose suspension with added sodium hydroxide is frozen, thawed and diluted with additional water with mixing or shaking to adjust the sodium hydroxide concentration to within the range of from about 4% to about 7% and the cellulose concentration to within the range of from about 0.1% to about 15%. After vigorous shaking, the cellulose is completely dissolved.

To authenticate the method of the present invention for dissolving cellulose, various procedures utilizing sodium hydroxide and microcrystalline cellulose (Avicel TM manufactured by FMC Corporation) were examined. All procedures were conducted at atmospheric pressures during the entirety of the procedures. None of the cellulose used was subjected to explosive disruption. The various procedures are set forth below in Table 1.

TABLE 1

| | Trials to Prepare Avicel Solution in Aqueous NaOH |
|---|---|
| Trial 1 | NaOH is added to Avicel suspension in water to adjust 5–15% NaOH, and the mixture is cooled at 4° C. for 1 day. |
| Trial 2 | Water is added to Avicel suspension in 15% NaOH to adjust 15–5% NaOH, and the mixture is cooled at 4° C. for 1 day. |
| Trial 3 | NaOH is added to Avicel suspension in water to adjust 5–15% NaOH, and the mixture is cooled at −20° C. for 4 hours. Then the mixture is defrosted at room temperature. |
| Trial 4 | NaOH is added to Avicel suspension in water to adjust 5–15% NaOH, and the mixture is cooled at −20° C. for 4 hours. Then the mixture is defrosted at room temperature, followed by the addition of water. |
| Trial 5 | Avicel suspension in water is cooled at −20° C. for 4 hours, and the frozen solid is defrosted at room temperature, followed by the addition of NaOH to adjust 5–15% NaOH. |

In Trial 1, the microcrystalline cellulose was added to water at a level of 2% to provide a cellulose suspension. NaOH pellets were added to the suspension at a level sufficient to provide 5% to 15% NaOH solutions at increments of 0.5% NaOH concentration. After being adjusted to a particular NaOH concentration and shaken vigorously, the suspension was cooled to 4° C. and kept at 4° C. for one day. At levels of 5% to 9.5%, there was no indication of dissolving or swelling. The microcrystalline cellulose was strongly swollen in 10–15% NaOH at this temperature, but was not completely dissolved.

In Trial 2, a 1.7% microcrystalline cellulose suspension in a 15% NaOH solution at 4° C. was first prepared. The microcrystalline cellulose was strongly swollen in this basic solution. Then 4° C. water was added to the suspension to adjust the NaOH concentration from 15% to 5% at 4° C. Complete dissolution was not achieved in this trial.

In Trial 3, microcrystalline cellulose (2%) suspensions in NaOH were cooled to −20° C. for 4 hours. The completely frozen samples (at NaOH concentrations of from 5% to 12%) and incompletely frozen samples (at NaOH concentrations above 13%) were placed at room temperature. After the defrosted solution attained room temperature, the solubility was checked visually. The microcrystalline cellulose was dissolved completely in 8–9% NaOH using this sequence, and was not dissolved completely in 5–7% and 10–17.5% NaOH.

In Trial 4, water was added at room temperature to the samples of Trial 3. The samples which were solidly frozen at −20° C. in 7%−12% NaOH provided a clear solution after being diluted to 9% to 5% NaOH solution by the addition of water at room temperature. The samples which were solidly frozen at −20° C. in less than 6% NaOH did not provide a clear solution. The samples which were incompletely frozen at −20° C., i.e., those samples wherein the treatment time at −20° C. was too short or the concentration of NaOH was above about 13% did not provide any clear solutions of cellulose.

In Trial 5, the cellulose-water suspension was frozen at −20° C., followed by thawing at room temperature and the addition of NaOH to levels of 5%−15% NaOH. The cellulose was not dissolved completely using this sequence. Thus, the solid, frozen pre-treatment of the cellulose suspension in 7−12% NaOH and the dilution treatment with water to 5−9% NaOH is necessary for the preparation of a completely clear solution at all levels of NaOH within the indicated workable range.

The following examples further illustrate various features of the invention, but are not intended to in any way limit the scope of the invention which is defined in the appended claims.

Example 1

Various cellulose samples were treated in accordance with the method of the present invention to provide cellulose solutions. In each of the Examples, one gram of a cellulose sample was suspended in 26.9 ml of water. 2.5 g of sodium hydroxide was added and the flask was shaken to dissolve the sodium hydroxide and provide an 8.5% sodium hydroxide solution. The sample was then cooled to a temperature of −20° C. to form a solid, tight mass. The sample was defrosted over a period of 1 hour at room temperature after which time the sample had attained room temperature. 20.6 ml of water at room temperature was then added to the sample with shaking. The resultant sample contained 2% cellulose in 5% sodium hydroxide.

Table 2 shows the solubilities of various cellulose samples, which were prepared from microcrystalline cellulose (Avicel TM) and linter cellulose, which had been subjected to the above treatment.

As shown in this table, all samples of Avicel TM were completely dissolved in aqueous NaOH, irrespective of difference in crystal forms and crystallinities. Low DP cellulose (DP of 15) was dissolved in more than 4% NaOH at room temperature without any freezing treatment.

TABLE 2

Solubility of Celluloses in Aqueous NaOH

| Cellulose Samples | Crystal from | Solubility (%) |
| --- | --- | --- |
| Low DP cellulose | cellulose II | 100 |
| Avicel TM group | | |
| Avicel | cellulose I | 100 |
| EDA-treated[a] | cellulose III$_I$ | 100 |
| Mercerized | cellulose II | 100 |
| Regenerated from cuen[b] (dry) | cellulose II | 100 |
| Regenerated from cuen[b] (wet gel) | cellulose II | 100 |
| Mercerized and EDA-treated[a] | cellulose III$_{II}$ | 100 |
| Regenerated from SO$_2$—DEA-DMSO[c] (dry) | amorphous | 100 |
| Regenerated from SO$_2$—DEA-DMSO[c] (wet gel) | amorphous | 100 |
| Linter cellulose group | | |
| Linter cellulose | cellulose I | 32 |

TABLE 2-continued

Solubility of Celluloses in Aqueous NaOH

| Cellulose Samples | Crystal from | Solubility (%) |
| --- | --- | --- |
| EDA-treated[a] | cellulose III$_I$ | 26 |
| Mercerized | cellulose II | 32 |
| Regenerated from cuen[b] (dry) | cellulose II | 94 |
| Regenerated from cuen[b] (wet gel) | cellulose II | 100 |
| Mercerized and EDA-treated[a] | cellulose III$_{II}$ | 37 |
| Regenerated from SO$_2$—DEA-DMSO[c] (dry) | amorphous | 99 |
| Regenerated from SO$_2$—DEA-DMSO[c] (wet gel) | amorphous | 100 | a = Ethylenediamine-treated sample
b = Regenerated cellulose prepared from 0.5 M Cupriethylenediame hydroxide solution
c = Regenerated cellulose prepared from SO$_2$-diethylamine-dimethylsulfoxide solution From the foregoing example, it can be soon that high DP cellulose, such as cotton linter cellulose, can be dissolved using the method of the present invention if the high DP cellulose is first regenerated from a cellulose solution formed by an intermediate or otherwise.

Such high DP celluloses, such as cotton linters and celluloses derived from wood pulp can also be dissolved utilizing the method of the present invention, the high DP cellulose is first pretreated in accordance with one of the following pretreatment methods.

The first of the pretreatment methods is referred to as the zinc chloride method and the second pretreatment is referred to as the phosphoric acid method. None of the above samples were pretreated with either the zinc chloride or phosphoric acid protreatments. If the samples had been pretreated, all of the samples would have had solubilities of 100% The steps of the zinc chloride method and the phosphoric acid method are as follows:

Zinc Chloride Method

To one gram of pulp, 100 g of 64% ZnCl$_2$ is added and the mixture is shaken vigorously to prepare a strongly swollen gel. Within 30 minutes (generally 5−20 minutes), the fiber form is destroyed and a swollen gel (some of the fibers seem to be dissolved) is obtained. The gel is then washed with water. The wet gel is then used for the following dissolution treatment in aqueous NaOH.

In order to shorten the time to obtain the gel, the following modification can be used. To one g of dissolving pulp, ca. 25 g of 58% ZnCl$_2$ is added. Then ca. 70 g. of 70% ZnCl$_2$ is added to provide a 64% ZnCl$_2$ solution. A much shorter time to obtain the complete destruction of the fiber form of the pulp is required.

For dissolution of bleached Kraft pulp, it takes ca. 5−30 minutes to obtain the complete destruction of fiber form. In the case of linter cellulose, it takes a longer time of about 1 day at room temperature.

It is difficult to achieve the complete destruction of the fiber form of cotton in ZnCl$_2$ at room temperature at least within 1 day.

Also the amount of ZnCl$_2$ solution may be reduced by more efficient mechanical stirring of the mixture.

Phosphoric Acid Method

To one g of dissolving pulp, ca. 100 g of 85% phosphoric acid was added, and the mixture was vigorously shaken to obtain a strongly swollen gel. Within 20 minutes (usually 5−15 minutes) at room temperature, a strongly swollen gel, which may be a high viscosity solution is obtained. As soon as the fiber form is destroyed, the gel is poured into water (or water is added to the swollen gel). A white regenerated gel is then collected and washed with water. The gel may then be placed in solution using the NaOH treatment of the invention.

Bleached Kraft pulp can also be subjected to the destruction of the fiber form according to the phosphoric acid method. It takes almost the same time to obtain the destruction of the fiber form as that of dissolving pulp. It takes more than 5 hours to destroy the fiber form of linter cellulose. It is difficult to achieve complete destruction of the fiber form of cotton by the phosphoric acid treatment.

The amount of phosphoric acid might be reduced by more efficient mechanical stirring of the mixture. Also, the time required for the complete destruction of the fiber form may be reduced by more efficient mechanical stirring of the mixture.

In accordance with the present invention, a method for dissolving cellulose is provided utilizing an alkaline component. Such simple and inexpensive method for cellulose dissolution has not been previously available to the cellulose industry.

After the cellulose solutions are formed in accordance with the method of the present invention, they can be treated with an acidic aqueous medium to regenerate the cellulose to provide various commercial products, such as cellulose fibers and cellulose sheets. The cellulose can also be regenerated in water, i.e. the acid is not necessarily required for all samples, which results in a more economically viable practice for industry. The cellulose solutions of the invention can also be used to coat articles or to penetrate articles followed by regeneration of the cellulose by treatment with an acidic aqueous solution. The cellulose solutions can also provide the basis for providing homogeneous derivatives of cellulose as well as to provide blends with other alkali soluble polymers and bead formation for some analytical gels.

What is claimed is:

1. A method for dissolving cellulose at atmospheric pressures without prior explosive disruption comprising the steps of:
   (a) providing a dispersion of cellulose in an aqueous strong base solution wherein the cellulose material has a DP of at least about 350, wherein said alkali solution comprises from about 7% to about 12% by weight of said strong base,
   (b) freezing said cellulose dispersion to a temperatures sufficient to form a solid mass of said cellulose dispersion;
   (c) warming said solid mass of said cellulose dispersion to a temperature sufficient to thaw said solid mass of said cellulose dispersion to provide a cellulose solution wherein the cellulose is dissolved; and
   (d) diluting the thawed cellulose dispersion with water.

2. A method in accordance with claim 1 wherein said strong base is selected from the group consisting of sodium hydroxide, potassium hydroxide and ammonium hydroxide.

3. A method in accordance with claim 1 wherein said strong base is sodium hydroxide.

4. A method in accordance with claim 1 wherein said cellulose is present in said cellulose dispersion at a level of from about 0.1% to about 15% by weight.

5. A method in accordance with claim 1 wherein said cellulose has a DP of from about 350 to about 2000.

6. A method in accordance with claim 1 wherein said dilution with water is sufficient to provide a cellulose solution having from about 0.1% to about 15% of cellulose and from about 4% to about 7% of said sodium hydroxide.

7. A method in accordance with claim 1 wherein the temperature in step (b) is in the range of from about $-10°$ C. to about $-30°$ C.

8. A method in accordance with claim 1 wherein the temperature in step (c) is from about 20° C. to about 30° C.

* * * * *